US012631596B2

(12) United States Patent
Chapuis et al.

(10) Patent No.: US 12,631,596 B2
(45) Date of Patent: May 19, 2026

(54) DEVICE AND METHOD FOR MANAGING RESOURCES FOR MONITORING ELONGATE STRUCTURES

(71) Applicant: COMMISSARIAT A L'ENERGIE ATOMIQUE ET AUX ENERGIES ALTERNATIVES, Paris (FR)

(72) Inventors: Bastien Chapuis, Tresserve (FR); Julien Albertini, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 483 days.

(21) Appl. No.: 18/024,959

(22) PCT Filed: Sep. 10, 2021

(86) PCT No.: PCT/EP2021/074936
§ 371 (c)(1),
(2) Date: Mar. 6, 2023

(87) PCT Pub. No.: WO2022/053614
PCT Pub. Date: Mar. 17, 2022

(65) Prior Publication Data
US 2023/0333061 A1 Oct. 19, 2023

(30) Foreign Application Priority Data

Sep. 11, 2020 (FR) ..................................... 2009236

(51) Int. Cl.
*G01N 29/04* (2006.01)

(52) U.S. Cl.
CPC ..... *G01N 29/043* (2013.01); *G01N 2291/102* (2013.01)

(58) Field of Classification Search
CPC .............. G01N 29/43; G01N 2291/102; B61L 23/044

(Continued)

(56) References Cited

U.S. PATENT DOCUMENTS

| 9,650,059 B2 * | 5/2017 | Cooper ................. B61L 23/044 |
| 9,981,671 B2 * | 5/2018 | Fraser ...................... B61K 5/00 |

(Continued)

FOREIGN PATENT DOCUMENTS

| FR | 3 064 968 A1 | 10/2018 |
| FR | 3 084 748 A1 | 2/2020 |
| GB | 2 372 669 A | 8/2002 |

*Primary Examiner* — Brian T Misiura
(74) *Attorney, Agent, or Firm* — BakerHostetler

(57) ABSTRACT

A method and a device for managing resources for monitoring elongate structures that can serve as elastic waveguides are provided. The structure is instrumented with a plurality of transducers capable of acquiring signals measuring characteristic quantities of elastic waves being propagated in the structure, each transducer being coupled to an electronic device installed along the structure. An electronic device comprises at least means for processing the measurement signals received from at least one transducer and a processor having code instructions for implementing steps of the resource management method consisting in: initializing an electronic device in nominal mode, the nominal mode making it possible to initiate an inspection of the elongate structure by a local analysis of elastic waves generated upon the passage of a mobile device in proximity to a transducer or initializing the device in detection mode, the detection mode making it possible to initiate, by a transducer, an emission of elastic waves in the elongate structure and make an inspection of the elongate structure by a local analysis of signals derived from the elastic waves emitted; maintaining the electronic device in nominal mode or switching the electronic device over to detection mode when an anomaly is detected in an inspection in nominal mode; maintaining the electronic device in detection mode or switching the electronic device over to assessment mode when a fault is detected in an inspection in detection mode, the assessment mode making it possible to transmit data on (Continued)

signals derived from elastic waves emitted in the structure to
a remote server to generate a more in-depth analysis.

15 Claims, 11 Drawing Sheets

(58) Field of Classification Search
USPC ......................................................... 713/320
See application file for complete search history.

(56) References Cited

U.S. PATENT DOCUMENTS

| | | | | |
|---|---|---|---|---|
| 11,130,510 | B2 * | 9/2021 | Esprey | G01H 9/004 |
| 11,447,166 | B2 * | 9/2022 | Lang | G08B 21/18 |
| 12,188,906 | B2 * | 1/2025 | Albertini | G01N 29/44 |
| 2012/0279308 | A1 * | 11/2012 | Yan | B61L 23/044 |
| | | | | 73/636 |
| 2015/0068296 | A1 | 3/2015 | Lanza di Scalea | |
| 2018/0222504 | A1 * | 8/2018 | Birch | B61L 23/044 |
| 2021/0009175 | A1 * | 1/2021 | Lata | B61L 23/044 |
| 2022/0135094 | A1 * | 5/2022 | Mesnil | G01N 29/2418 |
| | | | | 246/120 |
| 2023/0349788 | A1 * | 11/2023 | Chapuis | G01M 5/0066 |

* cited by examiner

Fishplate

Fishplate

Assessment
306

| | inspect | inspection recurrence if no fault | transmission to server | HT | GPS | LoRa | GSM | energy consumption | communication volume |
|---|---|---|---|---|---|---|---|---|---|
| nominal mode | on passage of a train | continuous | ping + report on passage of a train | off | off | on | off | - | - |
| detection mode | active | low periodicity | fault detection alert or no problem detected | on | on | on | off | - | - |
| standby detection mode | on passage of a train | low periodicity | complete noise signal | off | on | off | on | + | ++ |
| assessment mode | active | on demand | complete active signal | on | on | off | on | + | + |
| self-diagnostic mode | NA | low periodicity | self-diagnostic report | on | on | on | off | - | - |

FIG.12

DEVICE AND METHOD FOR MANAGING RESOURCES FOR MONITORING ELONGATE STRUCTURES

CROSS-REFERENCE TO RELATED APPLICATIONS

This application is a National Stage of International patent application PCT/EP2021/074936, filed on Sep. 10, 2021, which claims priority to foreign French patent application No. FR 2009236, filed on Sep. 11, 2020, the disclosures of which are incorporated by reference in their entirety.

FIELD OF THE INVENTION

The invention relates to the field of the monitoring of elongate structures that can serve as elastic waveguides, and relates in particular to the management of energy resources dedicated to the monitoring of such elongate structures.

BACKGROUND

In the railway sector, the rail is an elongate structure, all of which must be monitored. Being subject to very strong thermomechanical stresses (e.g. internal strains caused by disturbing thermal expansion, passage of the trains), the portions of rail wear over time and can sometimes be subject to clear breaks. The state of the railways must be monitored to reduce, or even eliminate, the risks of derailment. The upkeep of a rail network represents a major issue in terms of cost and safety for the rail operators.

Several approaches already implemented are known for monitoring all of the rails:

The detection of breaks is performed currently by a system called "railway circuit" which consists in circulating a low electrical current in the rails. When a train is engaged in a given portion, its axle short-circuits the two rails. This system thus makes it possible to ensure that the railway is free, that there is no lost wagon which has been lost by a preceding train, and therefore that the train can engage in the portion. Incidentally, this system detects some of the rail breaks (when the electrical discontinuity is sufficiently significant), but not necessarily all of them. This railway circuit approach for the detection of axles is however currently being abandoned in favor of a system called "axle counter" which compares the number of axles entering into the portion and those which leave it. The break detection function is not covered by this new system.

The detection of earlier faults, of crack type, is done using inspection devices, visual or ultrasound-based, or even electromagnetic, embedded on a maintenance train which travels along the railway lines as described in the application US 2015/0068296 A1. For issues of detection performance, this train cannot travel at the commercial speeds, but more slowly, which necessarily causes traffic to be hampered or even interrupted. This approach comprises at least two drawbacks:

given the number of kilometers to be inspected on the rail network, each portion is then inspected very infrequently, and therefore there is a risk of break before the beginning thereof is detected; and the embedded techniques generally have access only to the surface of the rail, and can therefore inspect only the top part of the rail (i.e. the rail head).

Another known approach for monitoring the state of the rails is an approach based on the analysis of signals derived from guided elastic waves, the rail then being an elastic waveguide. This solution consists in disposing, along the rail, transducers (a transducer also being able to be designated as "sensor") which emit elastic waves that are guided in the rails, which waves, interacting with faults (break or other more minor fault), generate a diffracted signal which is analyzed by dedicated software implemented in an electronic device (also designated as electronic "node" in the sense of "hub" pooling electronic resources), the set of the electronic devices constituting a network of nodes configured to detect and locate a fault. A system for monitoring a railway line can comprise a plurality of electronic nodes distributed in a network on the rails, each node being able to be associated with one or more transducers, and making a local analysis of the signals that it receives, using embedded analysis software. The results of the analyses of the electronic nodes can be communicated, generally by a wireless communication technology, to a remote server to allow a more overall analysis.

Moreover, a rail monitoring system depends greatly on the topology of the railway: the length of the rails, their geometries, the presence of telecommunication systems, the frequency of passage of the trains, etc. The known systems are developed and adjusted to the environment in which they are installed. For any new installation, a new study phase must be conducted to adapt the architecture of the system to the new environment, regardless of the monitoring technology retained, resulting in the significant redesign costs. There is currently no generic system which can be adapted directly to a new environment.

So, in light of the various limitations of the existing solutions, there is the need for a solution which mitigates the abovementioned drawbacks.

SUMMARY OF THE INVENTION

The present invention can be used for the monitoring of cables, pipes or any other elongate structure, that is to say having a priority direction, that can serve as elastic waveguides, for which the monitoring technique is based on the analysis of elastic waves. The analysis of the propagation of the waves makes it possible to inform on the integrity of the waveguide and therefore the presence or absence of faults.

Various industrial structures take the form of elongate elastic waveguides: for example a rail in the railway domain or in structures of gantry type. A pipe transporting a fluid is also an elongate structure of which it may be critical to ensure the integrity (notably in the oil or nuclear fields). Likewise, the invention can be applied to the monitoring of cables, for example for passenger transport systems (cable car or the like).

In a so-called "active" mode of operation, the analysis is performed on the waves emitted by a transducer. In a so-called "passive" mode of operation, the analysis is performed on the elastic waves generated by the passage of a mobile device on or in, or in proximity to, the structure being monitored.

In passive mode, the mobile device on a rail is generally a train or a mobile carriage. The wheel-rail contact generates the guided elastic waves which will then be analyzed. For the pipes transporting fluids, the displacement of mobile robots traveling for various missions (visual inspection for example) and provided with wheels or tracks to move in the pipe, can be a source of elastic waves that can be analyzed. For cables, either a device of cable-car type is displaced using wheels on the cable, or the cable is pulled and is displaced guided for example by wheels. In both cases, in the reference frame of the cable, a mobile device travels the length of the cable and is the source of elastic waves being propagated in the cable.

The subject of the invention is a device of electronic node type installed along or in proximity to an elastic waveguide, that can be used in particular in a system for monitoring the state of elongate waveguides based on the analysis of signals derived from guided elastic ultrasound waves, which optimizes the energy consumption of the resources used for the inspection of the waveguide.

In a general implementation, the device of the invention has a modular electronic architecture for which only the functional modules necessary to a given installation are activated and made operational.

Advantageously, the device of the invention which, by construction, is generic, is immediately applicable in different environments, regardless of the topology.

Advantageously, the device of the invention has a lower deployment cost than the known solutions for the railway application, because it can be transposed without a new design phase to different markets and different countries: subways/trains with different rail geometries and railway topologies; varied rail lengths; the presence or absence of fishplates and other railway elements. Only the resource allocation program possibly needs to be calibrated for a new application. Thus, a single hardware device has to be produced and maintained, which is much simpler industrially and less expensive that having to produce a new device for each market.

The device of the invention offers, among other advantages:

operation in active mode (with emission of guided waves by the system) and/or in passive mode (with use of the noise generated upon the passage of a mobile device over the structure);

operation in pulse-echo and/or transmission mode, offering a facility to interpret signals, to locate faults for the first neighboring node, with a range to a second neighboring node, diagnostic reliability if the two signals are used;

support of different communication protocols: LoRa for "long distance—low bit rate—low consumption" communications/Wi-Fi-Bluetooth for "short distance— high bit rate—high consumption" communications, but also the possibility of wired communication (Ethernet, optical fiber) if the situation allows it and requires it;

having different possible power sources: solar panels, batteries, mains, harvesting of vibratory energy from the structure;

allowing decisions to be made locally or remotely on a remote server;

not requiring wired connection between the nodes: insertion of an electronic node into the network is of "plug and play" type.

Advantageously, the device of the invention is implemented by a method for managing resources which allows an optimized strategy of the use of the device by being based on its multiple functionalities in order to make use of the most appropriate resources, notably in energy terms. The optimized management of the resources notably makes it possible to limit the energy consumption of the electronic node and therefore prolong the period of operation of the overall system without maintenance intervention if it is on an autonomous power source (or batteries/solar panels that are smaller/less expensive, etc.).

Advantageously, the device of the invention comprises a so-called standby mode for mitigating certain hardware failures (wave emission circuit, components that are among the most critical because they are likely to overheat), which makes it possible to limit the service downtime of the monitoring system. Since the device of the invention is more robust to certain hardware failures, that induces a reduction of maintenance costs.

To obtain the results sought, a method is proposed for managing resources for monitoring elongate structures that can serve as elastic waveguides. The structure is instrumented with a plurality of transducers capable of acquiring signals measuring characteristic quantities of elastic waves being propagated in the structure, each transducer being coupled to an electronic device installed along the structure. An electronic device comprises at least means for processing the measurement signals received from at least one transducer and a processor having code instructions to implement steps of the resource management method consisting in:

initializing an electronic device in nominal mode, said nominal mode making it possible to initiate an inspection of the elongate structure by a local analysis of elastic waves generated upon the passage of a mobile device in proximity to a transducer or initialize the device in detection mode, said detection mode making it possible to initiate, by a transducer, an emission of elastic waves in the elongate structure and make an inspection of the elongate structure by a local analysis of signals derived from the elastic waves emitted;

maintain the electronic device in nominal mode or switch the electronic device over to detection mode when an anomaly is detected upon in an inspection in nominal mode;

maintain the electronic device in detection mode or switch the electronic device over to assessment mode when a fault is detected in an inspection in detection mode, said assessment mode making it possible to transmit data on signals derived from elastic waves emitted in said structure to a remote server to generate a more in-depth analysis.

According to alternative or combined embodiments:

the step of initializing the device in nominal mode consists at least in deactivating the high-voltage components, the GNSS and the GSM communication;

the method comprises, before the step of switching the electronic device over to detection mode, a step of determining the time 'Td' elapsing between an increase in the average noise level in said elongate structure and the passage of a mobile device in proximity to a transducer;

the method comprises a step of waking up neighboring electronic devices of said electronic device, if the time 'Td' corresponds to a lowering with respect to a stored minimum value;

the step of switching the electronic device over to detection mode comprises a step of activating the high-voltage components to power the amplifiers ensuring the emission of the elastic waves and activating the GNSS to synchronize said device with the neighboring electronic devices;

the step of making an inspection of said elongate structure by a local analysis of signals derived from the elastic waves emitted comprises a step of determining whether neighboring electronic devices of said electronic device receive or do not receive the waves emitted;

the method comprises the steps of:

sending an analysis report to the remote server if said emitting device has received the waves emitted by the neighboring electronic devices, and reverting to the nominal mode; or sending an alarm message to the remote server if said device has not received waves emitted by the neighboring electronic devices, and switching over to assessment mode or maintaining the detection mode;

the step of transmitting data on signals derived from elastic waves emitted in said elongate structure to the remote server consists in sending the data via a GSM or wired communication;

the method further comprises a step of switching the electronic device over to nominal mode after the sending of the data;

the method comprises a step of switching the electronic device over from the nominal mode to the detection mode or to the assessment mode on request from the remote server or according to a predefined periodicity;

the method comprises a step of switching the electronic device over from the nominal mode or from the detection mode or from the assessment mode to a self-diagnostic mode in which said device checks that all of the elements of which it is composed (emission, reception, communication circuits, battery) and the transducers which are linked to it, are functional;

the method comprises a step of switching over to self-diagnostic mode on request from the remote server.

The invention also covers a computer program product comprising non-transient code instructions to perform the steps of the method of the invention, when the program is run on a computer.

The invention further covers a device for managing resources for the monitoring of elongate structures that can serve as elastic waveguides, which comprises means for implementing the steps of the method.

One subject of the invention is also a system for monitoring the state of railway lines which comprises a plurality of devices for managing resources for monitoring rails according to the invention.

BRIEF DESCRIPTION OF THE DRAWINGS

Other features and advantages of the invention will become apparent from the following description and the figures of the attached drawings in which:

FIG. 12 is a summary of the various activatable modes of a node.

DETAILED DESCRIPTION

Figure 1:
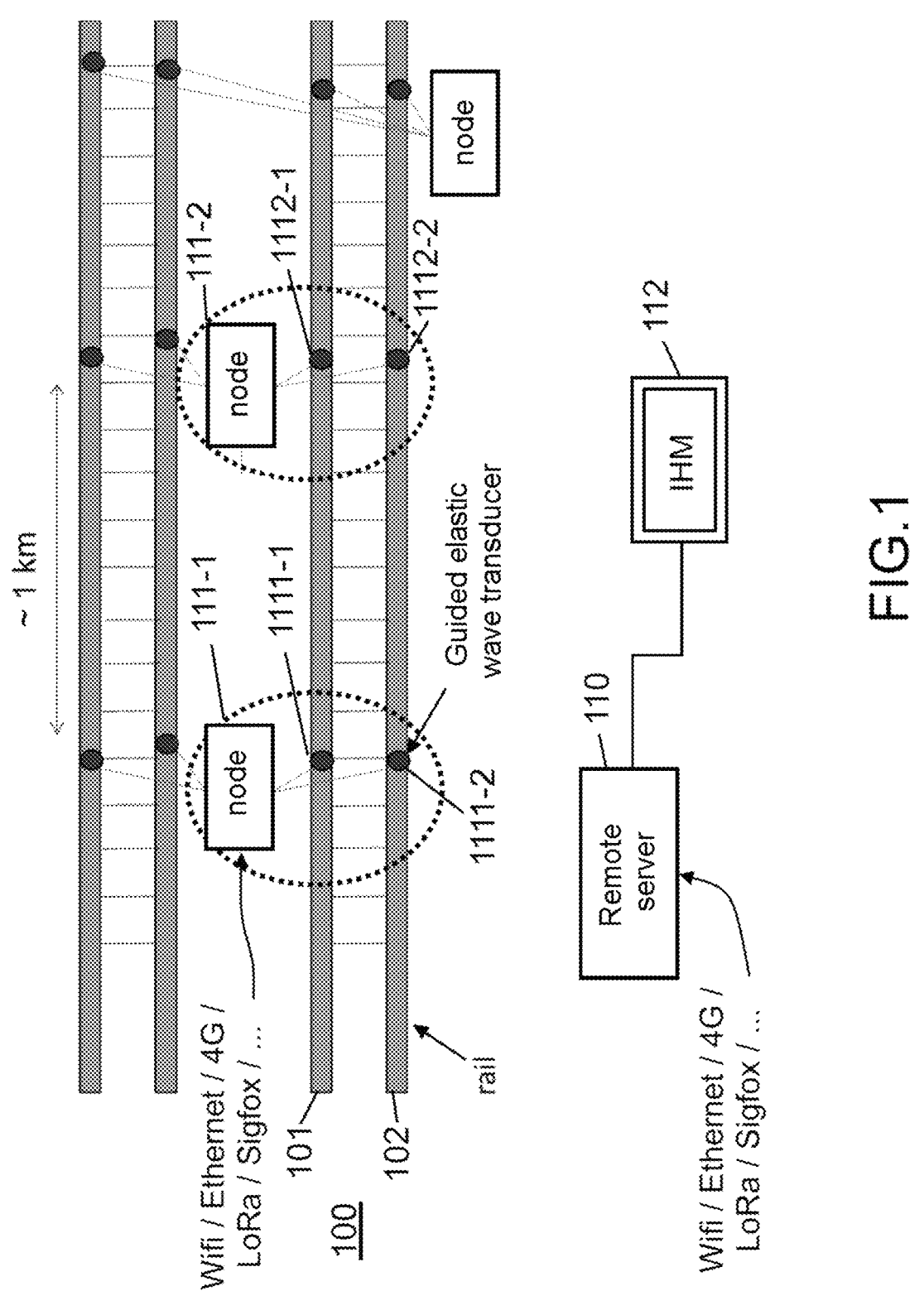
FIG. 1 illustrates a context of implementation of the device of the invention for a railway application.

FIG. 1 illustrates a context of implementation of the device of the invention for a railway application. However, this example is not limiting and the person skilled in the art will be able to adapt the implementation described to any other application implementing an elongate waveguide and a mobile device moving along the waveguide. In the example described, the waveguide is a rail and the mobile device is a train.

FIG. 1 shows the rails 101, 102 of a railway line 100 equipped with elastic wave transducers 1111-1, 1112-1, 1111-2, 1112-2.

The term "equipped" means that the transducers can be located on one or more placements selected from among: under the rail head, whether on the inner web of the rail and/or on the outer web of the rail, under the rail. In the example illustrated, two transducers (1111-1, 1111-2) are disposed respectively on one of the two rails 101, 102 in proximity to a first electronic node 111-1, and two transducers (1112-1, 12112-2) are disposed respectively on one of the two rails 101, 102 in proximity to a second electronic node 111-2.

The person skilled in the art will understand that the example is taken to describe the principles of the invention that is not limiting as to the number of transducers, of nodes that can be deployed and the distance between the nodes. For example, electronic nodes can be installed every kilometer along a railway line.

Although not described, transducers can also be disposed on the rails of a second railway line for the circulation of trains in the other direction, these transducers being able to be coupled to the same electronic nodes as the first railway line.

A transducer is a device converting one physical signal into another. There are a wide variety of transducers. For the generation and the reception of elastic waves being transmitted in a material (a rail, a tube, a structure, etc.), the use of an electromagnetic acoustic transducer (EMAT) can constitute an alternative to the use of a piezoelectric transducer (PZT).

The person skilled in the art will understand that the expression "elastic waves" used in the description more generally designates ultrasound waves (literally waves above 20 kHz audible frequency) that are elastic (which are propagated in a solid medium) and guided (the propagation is not free but forced by the geometry of the rail).

Each electronic node installed along a railway line is configured, i.e. comprises at least one elastic wave analysis software module, for analyzing signals derived from the transducers in order to determine the existence of a fault in the rails. Different types of elastic waves are propagated between two transducers 1111-1 and 1112-1. Each transducer can operate both as an emitter and as a receiver. Several signals can then be used, these signals corresponding to: a wave transmitted from the emitter to the receiver and vice versa, as well as a wave reflected when an emitter operates in pulse-echo mode (the same transducer acting as emitter and as receiver). Thus, the presence and/or the absence of a transmitted and/or reflected wave locally informs on the presence or not of a fault.

The electronic nodes are configured to communicate, with a remote server 110, messages informing on the presence or absence of a fault in the portion of rail considered. The analysis results can be displayed on an interface IHM 112 in a form that can be directly used by the user, visually indicating on a map of the line, for example, the location of the fault or faults, or in any other form suited to the application. An alert can be sent to the drivers of trains and/or to any traffic regulation system, and/or a braking command can be triggered according to the result of the analysis.

The communication of messages between the electronic nodes and the remote server can be established according to different short- or long-range, low- or high-bit rate communication protocols, possibly implementing different wires or wireless technologies, such as the 3G, 4G, 5G, Wi-Fi, Ethernet, optical fiber, LoRa, Sigfox, etc. technologies.

Figure 2:
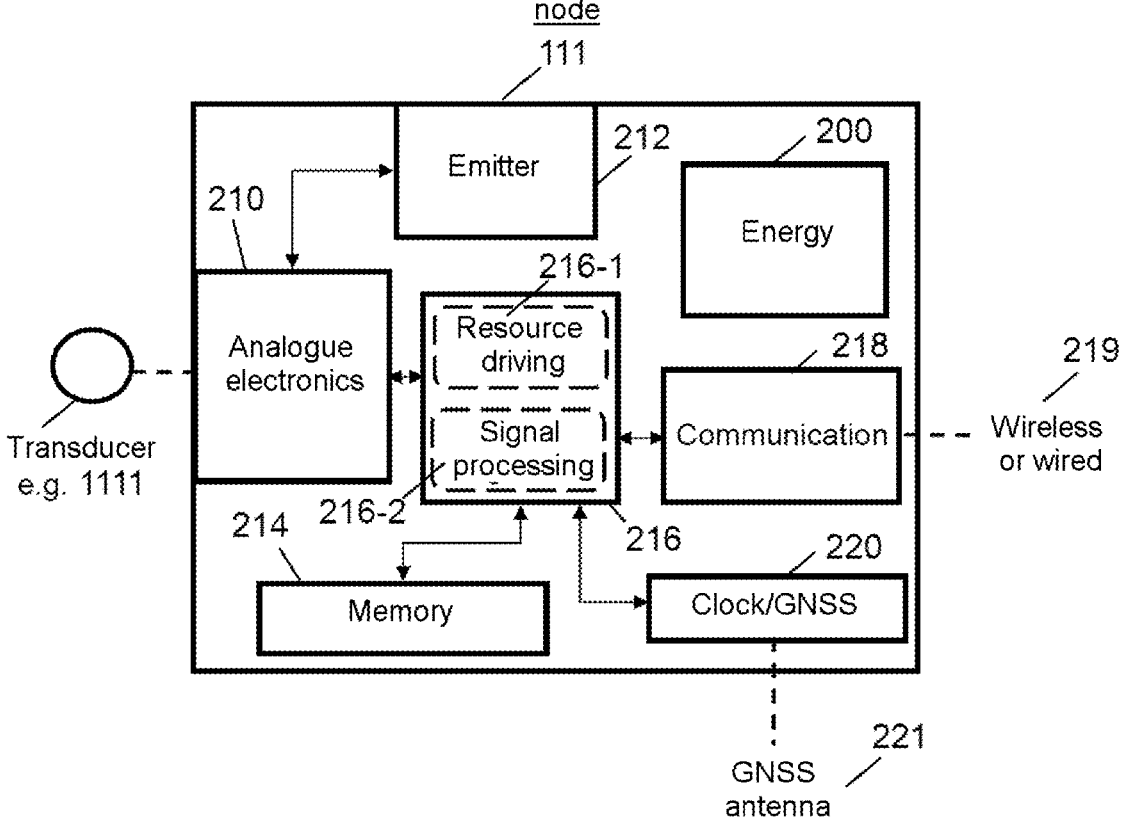
FIG. 2 illustrates an example of a structure of an electronic node according to the invention.

FIG. 2 illustrates an example of a structure of an electronic node 111 in an embodiment allowing the implementation of the method for driving the resources according to the invention.

Generally, a node 111 comprises: an energy source 200 (e.g. electrical power supply of battery type, solar panels, access to an external power supply, etc.); an electronic circuit comprises an elastic wave measurement circuit 210; an emitter circuit 212 for emitting elastic waves for the active mode (in passive mode, the emitter is not used because the energy of the train is used as a source of elastic waves); storage components 214; a computation circuit 216 associated with local or remote computation and/or memory resources, comprising a module for driving the resources and a module for processing the signals (FPGA, CPU or other for the processing of the signals received); a wireless or wired communication circuit 218; a GNSS (geolocation and navigation for a satellite system) receiver 220, for example of GPS type including an antenna 221 and embedded electronics. The GNSS circuit is advantageous for identifying the position of the node once disposed on the line, but also for date stamping the signals precisely (a precise date stamp to a few nanoseconds allows synchronization in post-processing).

A node 111 is coupled to at least one guided elastic wave transducer (e.g. 1111) which is for example installed on a rail in proximity to the node.

The energy source 200 can be provided by dynamo or capacity systems recharged by the passage of the trains on the railway line and/or by one or more photovoltaic panels and/or by one or more wind turbine masts and/or one or more batteries and/or a mains power supply, as nonlimiting examples.

The wireless communication circuit 218 comprises appropriate resources for establishing different communication modes: long-range low-bit rate communication mode (e.g. LoRa, Sigfox, etc.); short-range high-bit rate communication mode (e.g. Wi-Fi, Bluetooth, etc.).

In one embodiment, the wireless communication circuit 218 is configured to transmit fault diagnostic messages according to the long-range low-bit rate LoRa communication protocol, and appropriate components and associated antenna for receiving software update data according to the short-range high-bit rate Wi-Fi protocol.

The GNSS circuit 220 can be shared between several transducers. A satellite positioning system, called GNSS (for geolocation and navigation by a satellite system), relies on a constellation of artificial satellites allowing a user or a circuit (to be supplied via a portable receiver) with its position, its speed and the time. In one embodiment, the GNSS circuits are associated with the transducers so as to precisely time-stamp the signals measured by the transducers, while guaranteeing a synchronization of less than a microsecond between two nodes several kilometers apart (the distance is unimportant since there is GNSS coverage over the two nodes considered). In some embodiments, the time-stamping circuits and/or the computation circuits and/or the GNSS circuits can be variously distributed in space (e.g. existence of centers, entirely distributed system, hierarchical arrangement between nodes).

The computation circuit 216 comprises a signal processing module 216-1 which makes it possible, from signals emanating from the elastic waves received from the near neighboring nodes, to make a local diagnosis via embedded fault analysis software, regarding the presence or not of a fault locally. The fault analysis software makes it possible to determine or detect the existence of one or more faults locally over a length including a few transducers, from synchronized measurements of the elastic waves being propagated in the rail.

A local fault can be determined—its existence, its location and its category—by the application of predefined thresholds, said predefined thresholds being determined by reference to a real state, for example with respect to a state of the rail which is known to be healthy or with respect to a calibrated state of said rail, or with reference to a simulated state of the rail.

A fault can be characterized, notably in terms of nature, size, orientation in space or geometry, by an analysis of amplitude and/or of frequency and/or by an analysis of the form of the signal and/or by an analysis of the frequency spectrum of the measurement signals and/or of the function representative of the impulse response of the rail and/or by identification of a change of mode of propagation of at least one of the waves being propagated in the rail. A fault can notably be oriented horizontally or vertically. Based on the analysis of the signals, the position and the size can be estimated. Through learning or through comparison with charts drawn from mathematical or numerical models, a quantitative characterization can make it possible to determine a type of fault (rusting, crack, discontinuity, etc.).

The characterization of a fault can be done by differentiated diagnosis between the received signal being transmitted via the rail head and that being transmitted via the web of the rail. For example, if the signal is transmitted to one end of the rail and not the other, it is possible to approximately determine the extent of the fault and its position in the section of the rail. In the case where no signal is transmitted, it is probable that the break of the rail is virtually complete. To mitigate diagnosis uncertainties, advantageously the device of the invention makes it possible to upload all the local diagnostics to a supervisor (analysis module of a remote server) which aggregates all of the information to allow an overall diagnosis and an accurate fault characterization.

Since each node has only piecewise information on the overall system, the local and simplified diagnosis performed by a node can be transmitted to the remote server 110 where supervisory software makes it possible to aggregate the data from the nodes in order to improve the diagnosis, and issue a final decision. Indeed, when a node does not receive any signal, the latter considers that there is a rail break even though that can stem from the non-emission of the signal by the emitter. Also, the server which aggregates the information received from the nodes, will determine the state of said emitter node. The analysis done on the remote server thus makes it possible to refine the fault detection and generate better decisions.

The computation circuit 216 additionally comprises a resource driving module or processor 216-2 which is configured, i.e. which comprises code instructions, to manage the configuration of the resources used by the electronic node based on its multiple functionalities, in order to make the best use of the resources, notably in energy terms. Advantageously, the resource driving module implements an optimized node usage strategy which makes it possible to switch the node over from an analysis mode to another according to the context. The aim of the resource driving method of the invention is to allow the inspection of rails subject to a constraint of strong autonomy and energy saving. Thus, at any moment, through a so-called "smart" monitoring strategy, the node is in a state or mode in which the use of the resources is adapted to limit the energy consumption.

In a preferential implementation, the method of the invention manages three main modes for a node, in which each mode makes use of a different type of inspection of the rail, ranging from an inspection mode that is the least in-depth but the most economic to an inspection mode that is the most in-depth but the greatest consumer.

According to a variant embodiment, the node can be configured to have at least one additional mode, called self-diagnostic mode.

Figure 3:
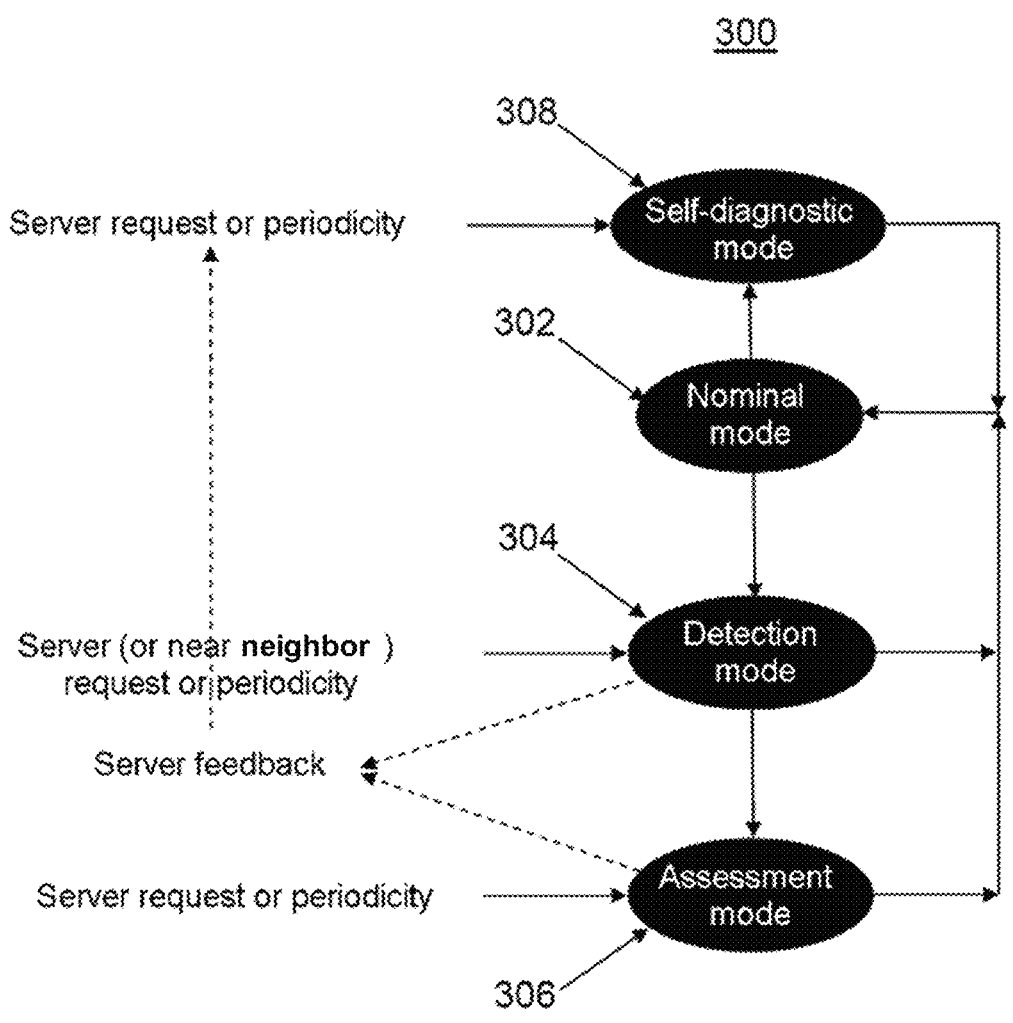
FIG. 3 illustrates different states of a node according to one embodiment.

FIG. 3 illustrates different states 300 of a node in order to limit the energy consumption while allowing an optimal monitoring of the rail.

An initial activation of a node or continuous activation, corresponding to a standard state can be a "nominal" mode 302 or a detection mode 304. The nominal mode 302 allows a monitoring of the rail while greatly limiting the consumption.

When an anomaly is detected in nominal mode, the node can remain in nominal mode or switch to "detection" mode 304 which is more powerful in the analysis in order to ensure the presence or absence of a fault. The detection mode 304 can also be activated on demand from the remote server or from a neighboring node or according to a predefined or parameterizable periodicity. In the case of detection of a fault in detection mode, the node can remain in detection mode or switch to "assessment" mode 306 which will consist in provoking, by the transmission of the ultrasound signal, a more in-depth analysis by the remote server or by an expert in order to confirm the sending of an alert if appropriate. Alternatively, depending on the characteristics of the network, the alert may however be sent directly when the node is in detection mode. The assessment mode 306 can also be activated on demand from the remote server or according to a predefined or parameterizable periodicity.

A node can be activated in a fourth state or "self-diagnostic" mode 308. In this mode, the node checks that all of the elements of which it is composed (emission, reception, communication circuits and battery) and the transducers which are linked to it, are operational. The self-diagnostic mode 308 can be activated on demand from the remote server, in response to a request from a node having reported a fault, regardless of the current mode (detection or assessment). An exemplary case would be, if a neighboring node of an emitter node has not received a signal assumed to have been emitted by the latter, then it would be important to check that that is not due to the failure of the emitter node but due to a rail fault. The server then sends a self-diagnostic mode activation command to the emitter node. The self-diagnostic mode can also be triggered in a programmed periodic manner.

Figure 4:
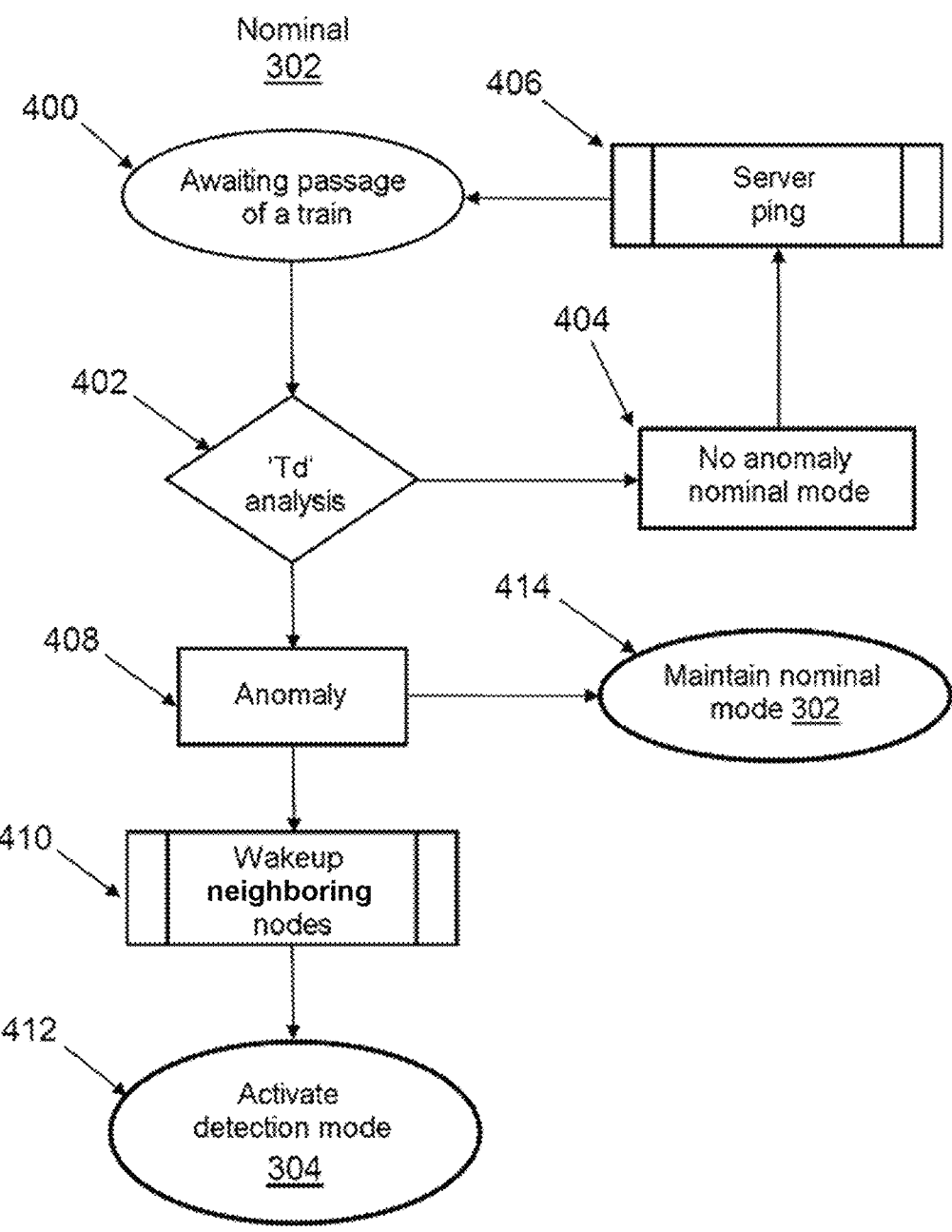
FIG. 4 illustrates in more detail the nominal mode of a node according to an embodiment.

FIG. 4 illustrates in more detail the nominal mode 302. When the node is in this mode, the inspection of the rail is performed without the emission of waves, and the node awaits 400 the passage of a train in order to analyze the ultrasounds generated by the passage of the train. Consequently in the nominal mode, the high-voltage part, the GPS and the GSM communication (3G/4G/5G) are deactivated. It is the least energy intensive mode which makes it possible to significantly limit the use of the batteries (or of the cells).

Figure 5:
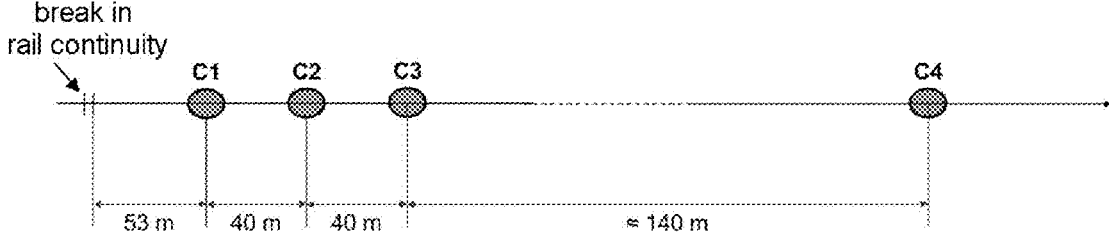
FIG. 5 illustrates a rail equipped with transducers for measuring signals on the passage of a train.
Figure 6:
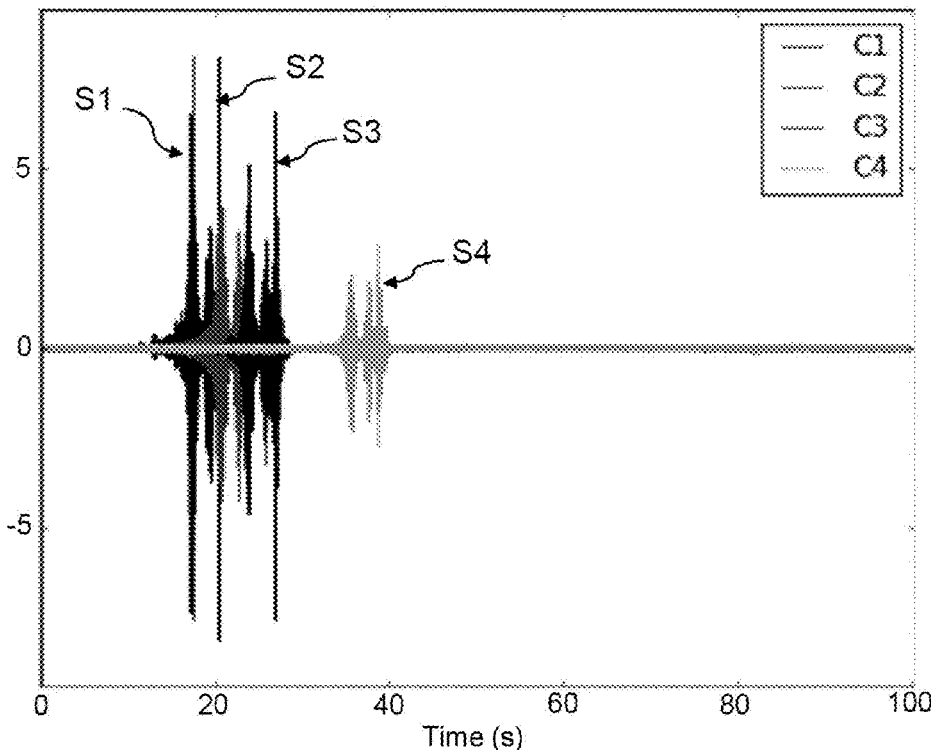
FIG. 6 illustrates signals measured by the transducers of FIG. 5.

The nominal mode is based on the very simple analysis of signals measured on the passage of a train on a line equipped with transducers, like the example of FIG. 5. Such an example of signals S1 to S4 measured by the transducers C1 to C4 is presented in FIG. 6 for a train composed of a locomotive and two wagons, rolling at 45 km/h, coming from the left and successively crossing the transducers C1, C2, C3 and C4, situated, with respect to the fishplate, according to the example respectively at 53 meters for C1, 93 meters for C2, 133 meters for C3, 273 meters for C4. The graph shows the progress of the train passing from one transducer to another by the signals S1 to S4, and the different peaks corresponding to the passages of the various axles over the transducers C1 to C4. Overall, the signal increases when the train approaches a transducer then decreases once it moves away from it. The person skilled in the art will be able to refer to the patent application FR3084748 from the Applicant for a more detailed description of the analysis of such signals measured on the passage of a train.

Figure 7A:
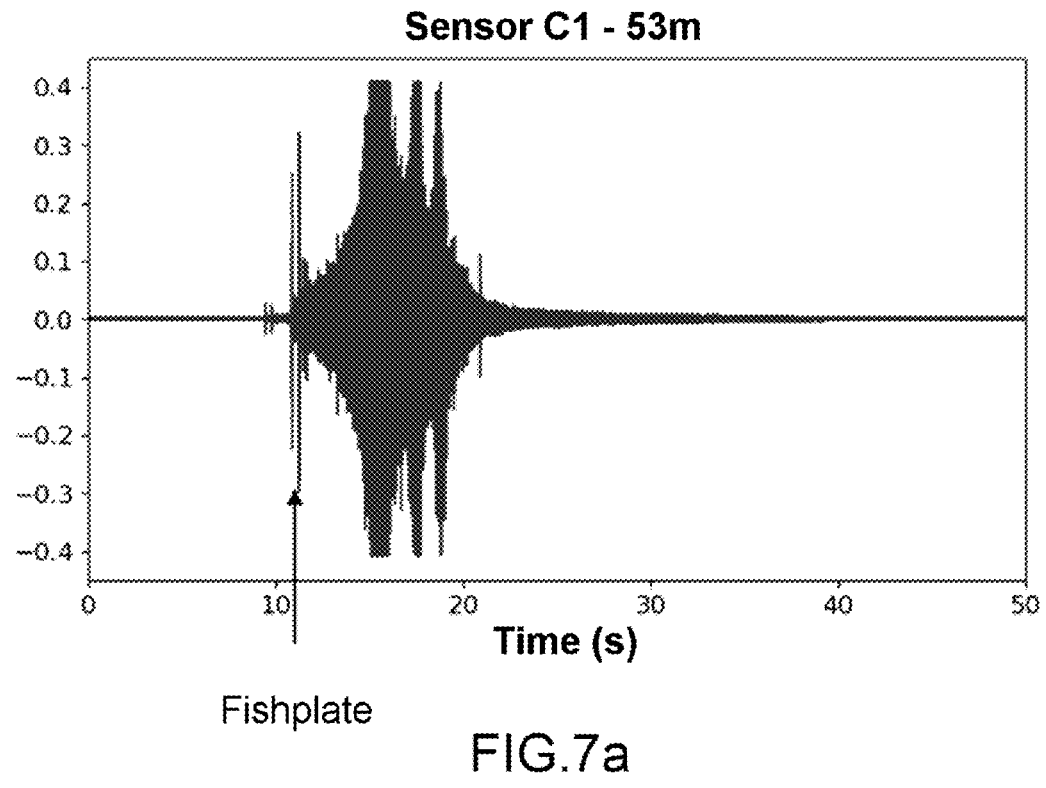
FIG. 7a illustrates a signal measured at a transducer close to a fishplate.
Figure 7B:
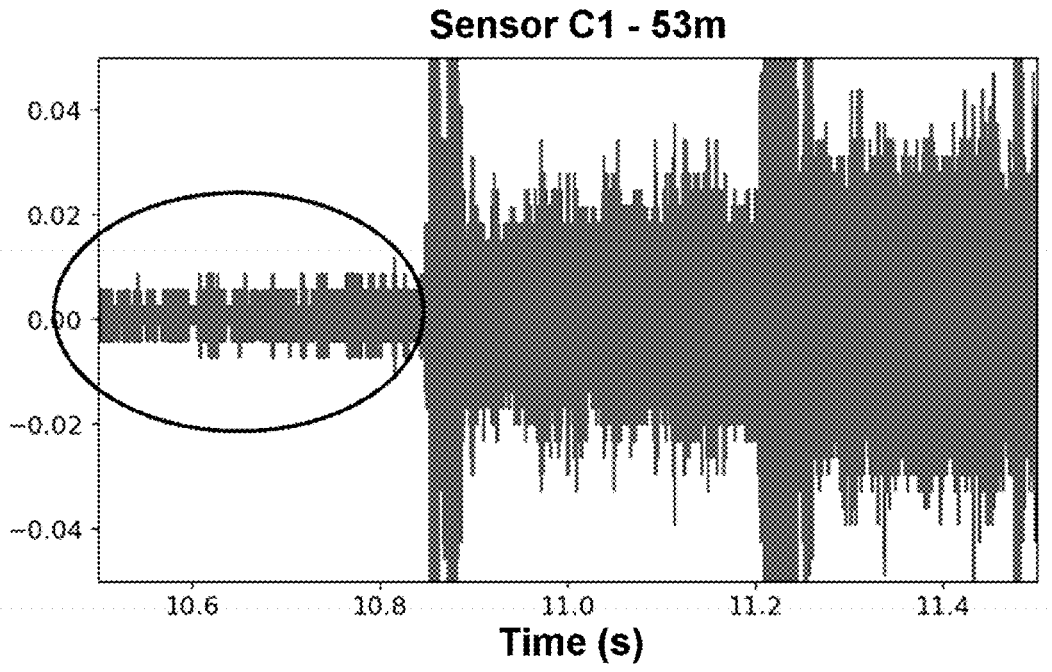
FIG. 7b is a zoom on the signal of FIG. 7a before and after the fishplate.

FIG. 7a shows the signal S1 measured at the transducer C1, and FIG. 7b is a zoom on the signal S1 before and after the fishplate. The passage of the train over the fishplate is reflected by the emission of waves of high amplitudes. Such waves would not be emitted upon the passage of the train over a real fault, because the separation between the two rails would be much less than that of the fishplate where it is a few millimeters. Moreover, by looking at the zone surrounded in black in FIG. 7b which corresponds to a period where the train is before the fishplate, a modification of the average noise level can be observed between the moment where the train is before the fishplate and the moment where the train is between the fishplate and the transducer C1.

Figure 8A:
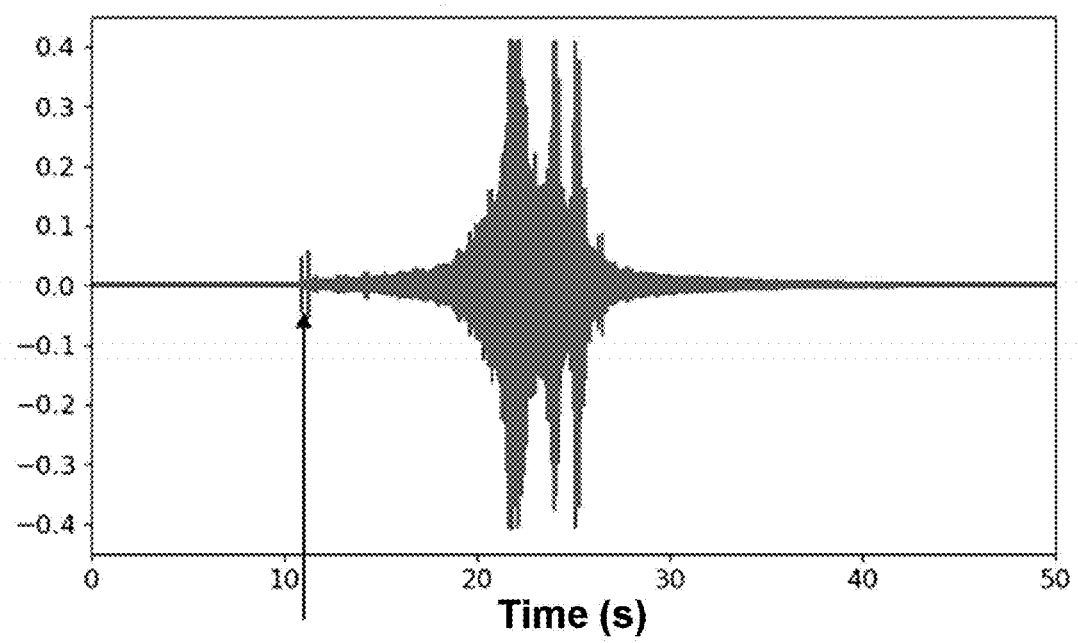
FIG. 8a illustrates a signal measured at a transducer further away from a fishplate.
Figure 8B:
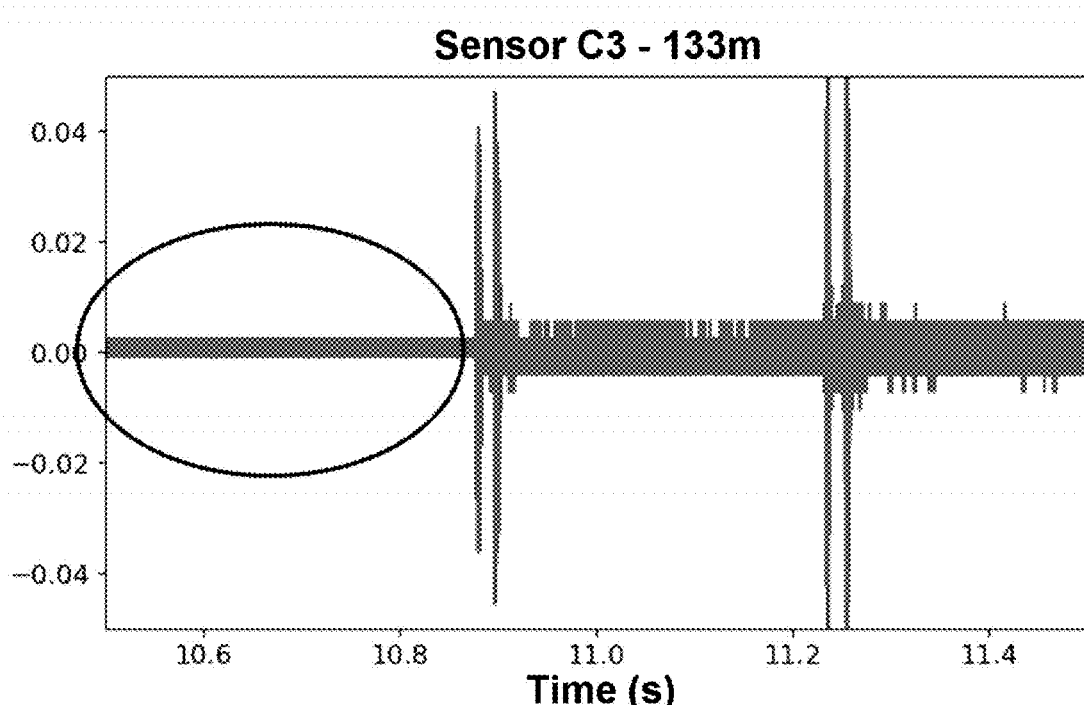
FIG. 8b is a zoom on the signal of FIG. 8a before and after the fishplate.

The same observations are also made by way of example in FIGS. 8a and 8b for the signal S3 from the transducer C3 situated at the greatest distance from the fishplate.

These observations reveal a break of mechanical continuity on the rail introduced by the fishplate, which drastically stops the propagation of the waves in the rail head, even if the waves continue very probably to be propagated through the web of the rail via the fishplate attachments. Thus, a separation of a few hundreds of nanometers is sufficient to stop the propagation of the ultrasounds in the case of a real fault.

Advantageously, the detection of an anomaly makes use of this phenomenon, by the measurement of the time 'Td' elapsing between a sudden increase of noise level detected and the passage of the train over a transducer. Without any anomaly, the time Td which is linked to a distance via the knowledge of the speed of propagation of the ultrasound waves in the rail, varies little: either Td is equal to the time corresponding to the distance between "the last fishplate encountered by the train before the sensor" and the sensor, or Td is equal to the time corresponding to "the maximum distance at which the signal is detected". This distance depends essentially on the sensitivity of the measurement chain and notably on the gain applied on acquisition of the signal, because, in practice, it is amplified signals which are analyzed in order to detect faults at the furthest possible distance.

Also, if the time Td decreases suddenly and greatly with respect to the absolute minimum of Td measured until the appearance of a decrease, that can be the sign of a break in mechanical continuity and therefore a potential rail anomaly.

The person skilled in the art will note that the average speed of propagation of the waves, approximately 3 km/s, is significantly greater than the maximum cruising speeds of the trains. So, a great reduction of time Td cannot therefore be due to a train passing more rapidly than the preceding ones. Moreover, if a train runs slowly or even stops between the detection and the passage at the transducer, then the time Td will increase.

Returning to FIG. 4, according to the principles of the invention, when the nominal mode 302 is activated on a node, the method makes it possible to switch to a step 402 of analysis of the time Td only on the passage of a train.

If the time Td measured remains constant with respect to the last minimum stored, meaning that there is no anomaly detected upon the passage of a train, the method makes it possible to maintain 404 the node in its nominal mode, and allows the node to send 406 at a regular frequency a message to the remote server indicating that it is still operational. In one embodiment, the messages are formatted according to the LoRa frame structure.

In one embodiment, a node can launch a self-diagnostic mode and send a report on its physical state at regular intervals. In one implementation, the self-diagnostic messages are formatted according to the LoRa frame structure, and are sent once a day.

Returning to the step 402, if the time Td measured corresponds to a sudden lowering with respect to the last minimum value stored, meaning that an anomaly is detected 408, the method makes it possible, in a next step 410, to wake up the neighboring nodes (n+1, n−1, even n−2 and n+2), i.e. activate the detection mode on the neighboring nodes, in order to make the analysis more in-depth. According to embodiments, the number of neighboring nodes woken up can vary according to different parameters including the propagation distance of the ultrasounds and the distance between the nodes. The communication between the current node and the neighboring nodes can be performed by a point-to-point LoRa communication or possibly by transiting through the remote server. In a next step 412, the method activates the detection mode of the node.

In one embodiment, the method makes it possible 414 to maintain the current node in nominal mode even in the case of detection of an anomaly.

Figure 9:
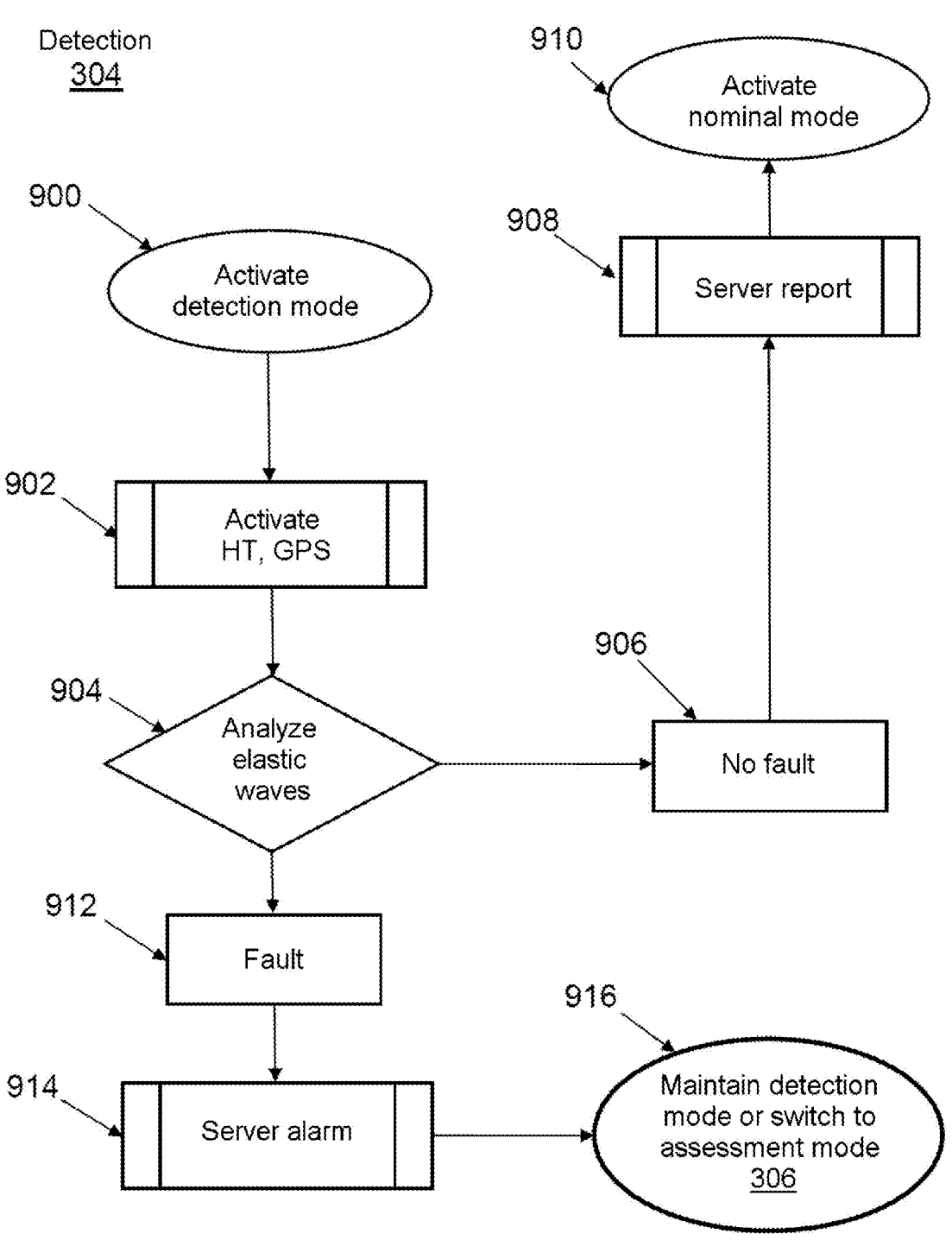
FIG. 9 illustrates in more detail the detection mode of a node according to an embodiment.

FIG. 9 illustrates in more detail the detection mode 304 of a node, making it possible to detect a break or an apparent fault on the rail. The activation 900 of the detection mode of a node can be triggered on initialization or following the detection of an anomaly during the analysis of the signals on the passage of a train. The detection mode can also be triggered automatically on request from the server, with a periodicity set by the operator of the network, or following a one-off request via a command sent by the server.

The frequency of inspection in automatic detection mode can be set according to several parameters:

the energy cost of such an inspection with respect to the quantity of energy available for the system, notably in the case of autonomous power supplies;

the frequency of passage of the trains: if the trains pass too infrequently then the nominal mode might not detect a fault;

the will to strengthen the reliability of the inspection of the nominal mode, which is very basic, for example for performance demonstration constraints.

In the detection mode, the inspection of the rail is done actively, that is to say by emission of ultrasound waves. The node generates a wave that is guided along the rail. In this mode, the method makes it possible (step 902) to activate the GPS in order to synchronize the nodes for the check, and the high-voltage to power the amplifiers ensuring the transmission (i.e. the firing) of the acoustic wave.

In a next step 904, the method makes it possible to analyze the firing. The method makes it possible to determine if the neighboring nodes, which have been previously woken up, receive or do not receive the emitted wave.

In the absence of a rail break, the neighboring nodes receive the emitted wave, meaning that there is no fault 906, and the method switches to a next step 908 to send an analysis report to the remote server indicating that the emitting device has received the waves emitted by the neighboring electronic devices, then the method makes it possible to switch the current node over to its nominal state 910.

If the neighboring nodes receive nothing, that can potentially indicate the presence of a break or of a critical fault 912. The method makes it possible, in a next step 914, to send an alarm message to the remote server if the emitting device has not received waves emitted by the neighboring electronic devices, then makes it possible 916 to switch over to assessment mode 306 or maintain the detection mode 304.

The fault detection can also be done by the return of a wave to the emitting node (pulse-echo mode). This return is characteristic of the presence either of a fault or of a rail break (i.e. of one or more welds, known and unknown).

When a fault is detected but below a critical dimension, it can be useful to archive the corresponding signal in order to conduct more in-depth analyses and be able to monitor how it evolves over time.

Figure 10:
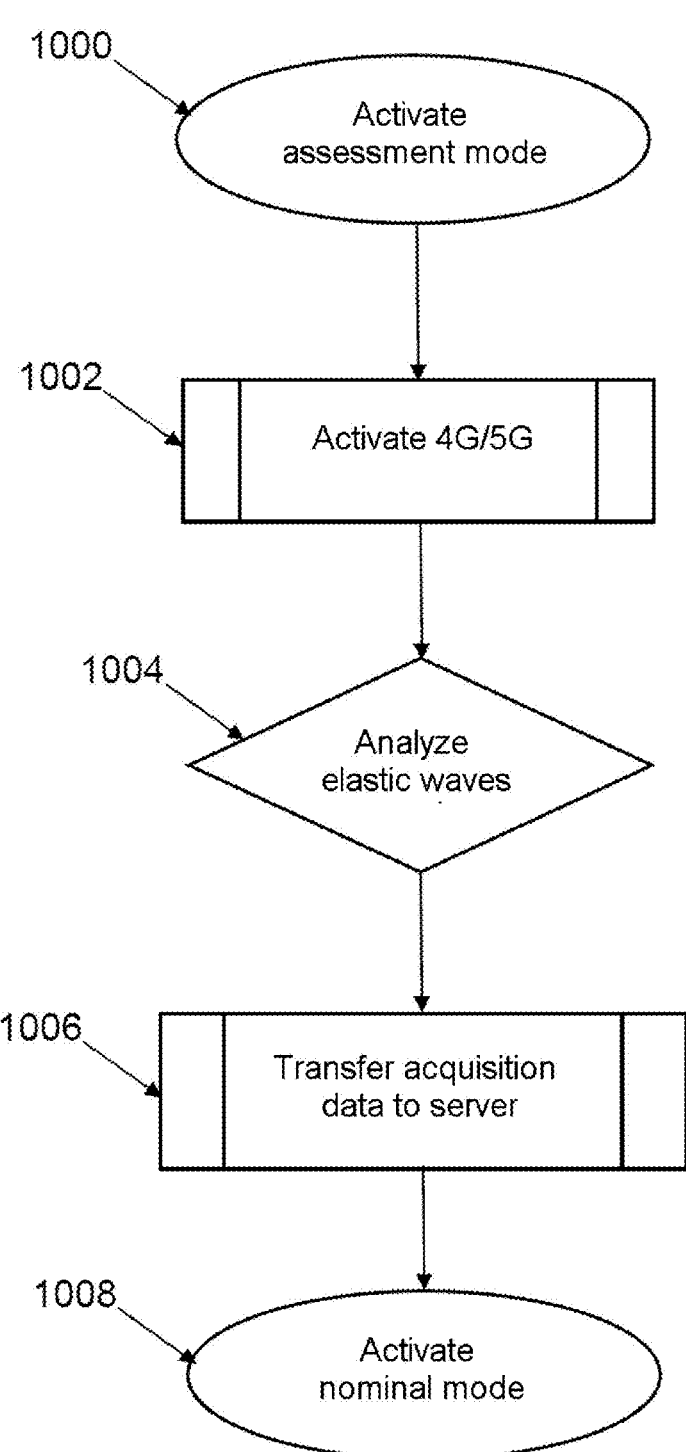
FIG. 10 illustrates in more detail the assessment mode of a node according to an embodiment.

FIG. 10 illustrates in more detail the assessment mode 306 of a node that makes it possible to conduct a more in-depth analysis upon the detection of a fault by an ultrasound analysis 904. The activation 1000 of the assessment mode of a node can also be triggered on demand, not necessarily in case of detection of a fault, by a command sent via the remote server to nodes selected by an expert. This functionality can be useful for example to keep a traceability of the measured signals in the course of operation of the network.

In this mode, the inspection is done actively like the detection mode. The method makes it possible to activate 1002 the GSM communication (3G/4G/5G) on the node, and to proceed with an emission of elastic waves (ultrasound firing) 1004.

In a next step 1006, the ultrasound signal stored by the node is sent to the server via the GSM communication, then the node returns to a nominal mode in a next step 1008.

A complete analysis of the transferred data can be performed by the server or by an expert and no longer in the node. In case of an analysis indicating a critical fault, an alert can be sent.

In the case of failure of the wave emission circuit, which is the most critical circuit of an electronic node because it requires a high voltage and very great quantities of energy, the node can switch over to a "standby detection" mode to perform a detection by analysis of impulse response. In this case, as described in the application FR3084748 from the applicant, there is no emission of ultrasound waves, the measurement is performed on the passage of a train. This standby detection mode entails sending to the server, via the activation of the GSM communication, the noise signals measured on the passage of the trains by the failing node and its nearest neighbors, which is more costly in terms of energy than a communication of LoRa type. The major advantage offered by this standby detection mode lies in the fact of continuing to ensure the monitoring of the portion of rail around the failing node for a given period, and it does not necessitate immediate maintenance of the system or even an interruption of the passage of the trains if the rail break detection function is a security function.

In the standby detection mode, the server is responsible for the analysis of the noise signals, then for the decision-making part concerning the sections on either side of the node whose emission circuit is failing.

Advantageously, this alternative to the active mode can make it possible to prolong the life of the node in case of failure of the wave emission circuit and thus reduce the system maintenance costs.

Figure 11:
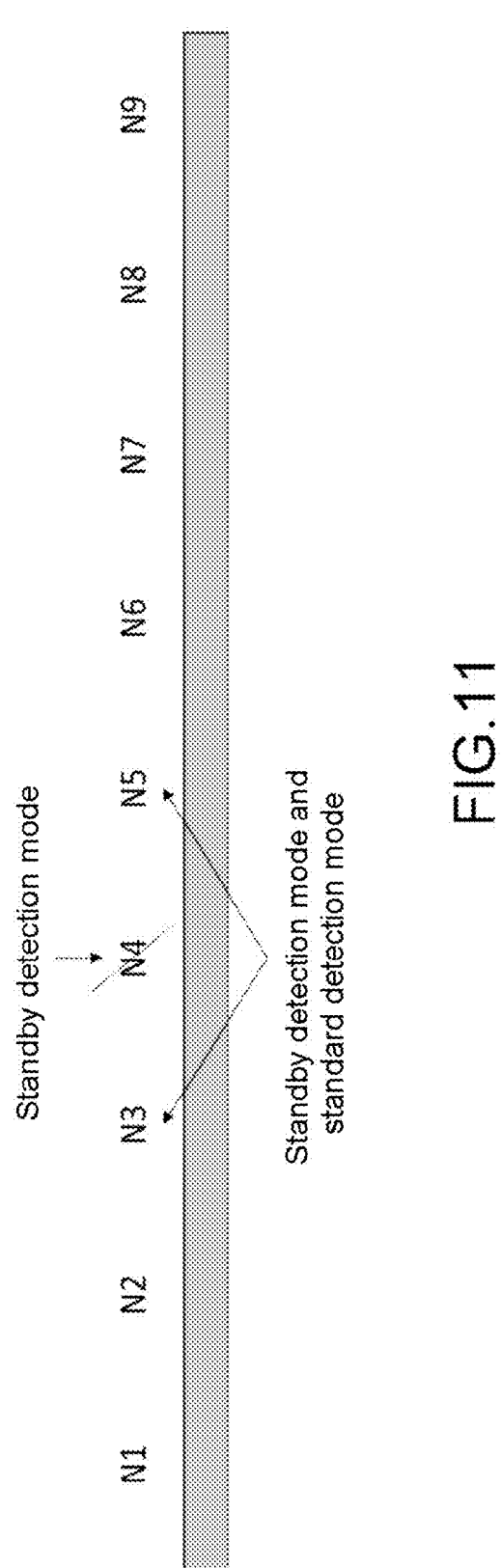
FIG. 11 illustrates in more detail the standby detection mode for a failing node according to an embodiment.

FIG. 11 illustrates the processing of a failing node. The switching over of the neighboring nodes N3 and N5 of a failing node N4 to standby detection mode can be performed via a command sent in LoRa mode by the failing node N4 point-to-point with its neighbors N3 and N5, or else by transiting through the server. The neighboring nodes for which the standby mode is activated nevertheless continue to handle their detection mission in standard active detection mode to provide the interface with the other nodes of the network. Thus, if the failing node N4 detects an anomaly in nominal mode, its neighbors switch over to standby detection mode and await the passage of a train (just like the failing node) to make their analysis. To maintain compatibility with the other nodes of the network (N2 and N6 in particular), the neighboring nodes N3 and N5 do however continue their operations that are normally scheduled by the detection mode and grasp the opportunity of the passage of the next train to conduct the joint analysis with the node N4 in standby detection mode.

It should be noted that, for the neighboring nodes N3 and N5, the standby detection mode takes priority over the standard detection mode in case of passage of a train. Indeed, the noise generated by the passage of the train renders the analysis of the signals in active mode unusable. At the end of the passage of the train, the nodes N3 and N5 if necessary finish the sequences scheduled in detection mode then switch back over to nominal mode.

FIG. 12 is a summary table of the configuration of different functions according to the mode that is activated of a node.

The invention can be implemented based on hardware and/or software elements. It can be available as a computer program product on a computer-readable medium. The medium can be electronic, magnetic, optical or electromagnetic. The computing resources or means can be centralized and/or distributed ("cloud computing"), possibly with or according to peer-to-peer and/or virtualization and/or redundancy technologies. The software code can be executed on any appropriate processor (for example a microprocessor) or processor core or a set of processors whether they are provided in a single computation device or distributed between several computation devices. The computing implementation of the invention can use centralized systems (e.g. client-server or master-slave) and/or distributed systems (e.g. architecture of peer-to-peer type using the accessible computing resources, possibly opportunistically, e.g.

ad hoc networks, etc.). The system (or its variants) implementing one or more of the steps of the method can use one or more dedicated electronic circuits or a general-purpose circuit. The method can also be implemented on a reprogrammable computation machine (a processor or a microcontroller for example) running a program comprising a sequence of instructions, or on a dedicated computation machine (for example a set of logic gates like an FPGA or an ASIC, or any other hardware module). A dedicated circuit can notably improve performance. The reference to a computer program which, when it is run, performs any one of the functions described previously, is not limited to an application program running on a single host computer. On the contrary, the terms computer program and software are used here in a general sense to refer to any type of computing code (for example application software, firmware, a microcode, APIs, web services, or any other form of computer instruction) which can be used to program one or more processors to implement steps of the method.

The invention claimed is:

1. A method for managing resources for monitoring elongate structures that can serve as elastic waveguides, the structure being instrumented with a plurality of transducers capable of acquiring signals measuring characteristic quantities of elastic waves being propagated in the structure, each transducer being coupled to an electronic device installed along the structure, each electronic device configured to process the measurement signals received from at least one transducer, wherein the electronic device comprises a processor having code instructions for implementing steps consisting in:

initializing the electronic device in nominal mode, said nominal mode being configured to initiate an inspection of the elongated structure by a local analysis of elastic waves generated upon the passage of a mobile device in proximity to a transducer with which the electronic device is coupled, or initializing the electronic device in detection mode, said detection mode being configured to initiate, by a transducer with which the electronic device is coupled, an emission of elastic waves in the elongate structure and to make an inspection of the elongated structure and inspecting the elongated structure by a local analysis of signals derived from the elastic waves emitted;

determining if an anomaly is detected when inspecting in nominal mode, and in case, either maintaining the nominal mode or switching the electronic device to a detection mode to initiate with a transducer with which the electronic device is coupled an emission of elastic waves in the elongated structure and inspecting the elongated structure by local analysis of signals from the emitted elastic waves;

determining if an anomaly is detected when inspecting in detection mode, and in case, either maintaining the detection mode or switching the electronic device to an assessment mode, said assessment mode being configured to allow the electronic device to transmit data on signals derived from elastic waves emitted in said elongated structure when inspecting in detection mode, to a remote server to generate a more in-depth analysis.

2. The method as claimed in claim 1, wherein the step of initializing the device in nominal mode consists at least in deactivating high-voltage components, global navigation satellite system (GNSS) communication, and global system for mobile communications (GSM) communication.

3. The method as claimed in claim 1, comprising, before the step of switching the electronic device over to detection mode, a step of determining the time 'Td' elapsing between an increase in the average noise level in said elongate structure and the passage of a mobile device in proximity to a transducer.

4. The method as claimed in claim 3, comprising a step of waking up neighboring electronic devices of said electronic device, if the 'Td' corresponds to a lowering with respect to a stored minimum value.

5. The method as claimed in claim 1, wherein the step of switching the electronic device over to detection mode comprises a step of activating the high-voltage components to power the amplifiers ensuring the emission of the elastic waves and in activating the GNSS to synchronize said device with the neighboring electronic devices.

6. The method as claimed in claim 1, wherein the step of making an inspection of said elongate structure by a local analysis of signals derived from elastic waves emitted, comprises a step of determining whether neighboring electronic devices of said electronic device receive or do not receive the emitted waves.

7. The method as claimed in claim 6, comprising:

sending an analysis report to the remote server if said emitting device has received waves emitted by the neighboring electronic devices, and reverting to the nominal mode; or sending an alarm message to the remote server if said device has not received waves emitted by the neighboring electronic devices, and switching over to assessment mode or maintaining the detection mode.

8. The method as claimed in claim 1, wherein the step of transmitting data on signals derived from elastic waves emitted in said elongate structure to the remote server, consists in sending the data via a GSM or wired communication.

9. The method as claimed in claim 8, further comprising a step of switching the electronic device over to nominal mode after the sending of the data.

10. The method as claimed in claim 1, comprising a step of switching the electronic device over from nominal mode to detection mode or to assessment mode on request from the remote server or according to a predefined periodicity.

11. The method as claimed in claim 7, comprising a step of switching the electronic device over from the nominal mode or the detection mode or the assessment mode to a self-diagnostic mode in which said device checks that all of the elements of which it is composed (emission, reception, communication circuits and battery) and the transducers which are linked to it, are functional.

12. The method as claimed in claim 11, comprising a step of switching over to self-diagnostic mode on request from the remote server.

13. A non-transitory computer program product, said non-transitory computer program comprising code instructions to perform the steps of the method as claimed in claim 1, when said program is run on a computer.

14. A device for managing resources for monitoring elongate structures that can serve as elastic waveguides, the device configured to perform the steps of the method as claimed in claim 1.

15. A system for monitoring the state of railway lines comprising a plurality of devices for managing resources for monitoring rails as claimed in claim 14.

* * * * *